United States Patent
Allen et al.

(10) Patent No.: US 9,501,608 B1
(45) Date of Patent: Nov. 22, 2016

(54) TIMING ANALYSIS OF CIRCUITS USING SUB-CIRCUIT TIMING MODELS

(71) Applicant: International Business Machines Corporation, Armonk, NY (US)

(72) Inventors: Robert J. Allen, Jericho, VT (US); Yanai Danan, Tel Aviv (IL); Vasant B. Rao, Hopewell Junction, NY (US); Xin Zhao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/736,692

(22) Filed: Jun. 11, 2015

(51) Int. Cl.
  *G06F 9/455* (2006.01)
  *G06F 17/50* (2006.01)
  *G01R 31/317* (2006.01)

(52) U.S. Cl.
  CPC ..... *G06F 17/5081* (2013.01); *G01R 31/31725* (2013.01)

(58) Field of Classification Search
  USPC ......................................... 716/108, 113, 134
  See application file for complete search history.

(56) References Cited

U.S. PATENT DOCUMENTS

| | | | |
|---|---|---|---|
| 5,850,355 A * | 12/1998 | Molnar | G06F 17/5022 703/15 |
| 7,051,318 B1 | 5/2006 | Lakshmanan et al. | |
| 7,647,220 B2 | 1/2010 | Kulshreshtha et al. | |
| 8,543,954 B1 * | 9/2013 | Keller | G06F 17/5031 703/14 |
| 8,578,310 B2 | 11/2013 | Kalafala et al. | |
| 8,745,560 B1 | 6/2014 | Bhardwaj et al. | |
| 8,756,547 B2 | 6/2014 | Teig et al. | |
| 2003/0115035 A1 * | 6/2003 | Kulshreshtha | G06F 17/5022 703/19 |

* cited by examiner

*Primary Examiner* — Brian Ngo
(74) *Attorney, Agent, or Firm* — Joe Petrokaitis

(57) ABSTRACT

Examples of techniques for analyzing and generating timing reports for circuits are described herein. A computer-implemented method includes splitting a netlist or cross section of a circuit into sub-circuits. The method further includes building a timing graph by combining generated timing models of the sub-circuits. The method includes determining a full set of dependencies based on each sub-circuit's dependent configuration parameters. The method also further includes generating a sample plan for each sub-circuit. The method includes receiving results from a simulation for each sub-circuit based on the sample plan for each sub-circuit. The method includes generating algebraic forms for an early delay, a late delay, and a slew by curve fitting across the configuration parameters. The method includes propagating arrival times and slew in algebraic forms throughout the timing graph. The method includes evaluating checks based on selected projections from the timing graph to find a worst slack configuration.

20 Claims, 8 Drawing Sheets

400

TIMING ANALYSIS OF CIRCUITS USING SUB-CIRCUIT TIMING MODELS

BACKGROUND

The present techniques relate to circuit timing. More specifically, the present techniques relate to timing analysis of digital circuits.

SUMMARY

According to an embodiment described herein, a system can include a processor. The processor can split a netlist or cross section of a circuit into sub-circuits. The processor can also generate a timing model for each sub-circuit and build a timing graph by combining the timing models of the sub-circuits. The processor can also further determine a full set of dependencies based on each sub-circuit's dependent configuration parameters and configuration parameters that a load and inputs of the circuit are dependent on. The processor can also generate a sample plan for each sub-circuit with dependencies based on the full set of dependencies. The processor can also receive results from a simulation for each sub-circuit based on the sample plan for each sub-circuit. The processor can also generate algebraic forms for an early delay, a late delay, and a slew by curve fitting across the configuration parameters. The processor can also determine a piecewise-linear minimum and a piecewise-linear maximum for each of the algebraic forms of the arrival time from segments arriving at a common node in the timing graph and propagate arrival times and slew in algebraic forms throughout the timing graph. The processor can also evaluate checks based on selected projections from the timing graph or over a complete set of configurations to determine a configuration with a worst slack.

According to another embodiment described herein, a computer-implemented method can include splitting, via a processor, a netlist or cross section of a circuit into sub-circuits. The method can also include generating, via the processor, a timing model for each sub-circuit and building a timing graph by combining the timing models of the sub-circuits. The method can also further include determining, via the processor, a full set of dependencies based on each sub-circuit's dependent configuration parameters and configuration parameters that a load and inputs of the circuit are dependent on. The method can also include generating, via the processor, a sample plan for each sub-circuit with dependencies based on the full set of dependencies. The method can further include receiving, via the processor, results from a simulation for each sub-circuit based on the sample plan for each sub-circuit. The method can also include generating, via the processor, algebraic forms for an early delay, a late delay, and a slew by curve fitting across the configuration parameters. The method can also include determining, via the processor, a piecewise-linear minimum and a piecewise-linear maximum for each of the algebraic forms of the arrival time from segments arriving at a common node in the timing graph and propagating arrival times and slew in algebraic forms throughout the timing graph. The method can also include evaluating, via the processor, checks based on selected projections from the timing graph to find a worst configuration.

According to another embodiment described herein, a computer program product for analyzing and generating timing reports for digital circuits can include a computer-readable storage medium having program code embodied therewith, wherein the computer readable storage medium is not a transitory signal per se. The program code can be executable by a processor to cause the processor to split a netlist or cross section of a circuit into sub-circuits. The program can also cause the processor to generate a timing model for each sub-circuit and build a timing graph by combining the timing models of the sub-circuits. The program can further also cause the processor to determine a full set of dependencies based on each sub-circuit's dependent configuration parameters and configuration parameters that a load and inputs of the circuit are dependent on. The program code can also cause the processor to generate a sample plan for each sub-circuit with dependencies based on the full set of dependencies. The program code can also cause the processor to receive results from a simulation for each sub-circuit based on the sample plan for each sub-circuit. The program code can also cause the processor to generate algebraic forms for an early delay, a late delay, and a slew by curve fitting across the configuration parameters. The program code can also cause the processor to determine a piecewise-linear minimum and a piecewise-linear maximum for each of the algebraic forms of the arrival time from segments arriving at a common node in the timing graph and propagate arrival times and slew in algebraic forms throughout the timing graph. The program code can also cause the processor to evaluate checks based on selected projections from the timing graph or over the complete set of configurations to determine a worst slack configuration.

DETAILED DESCRIPTION

Figure 1:
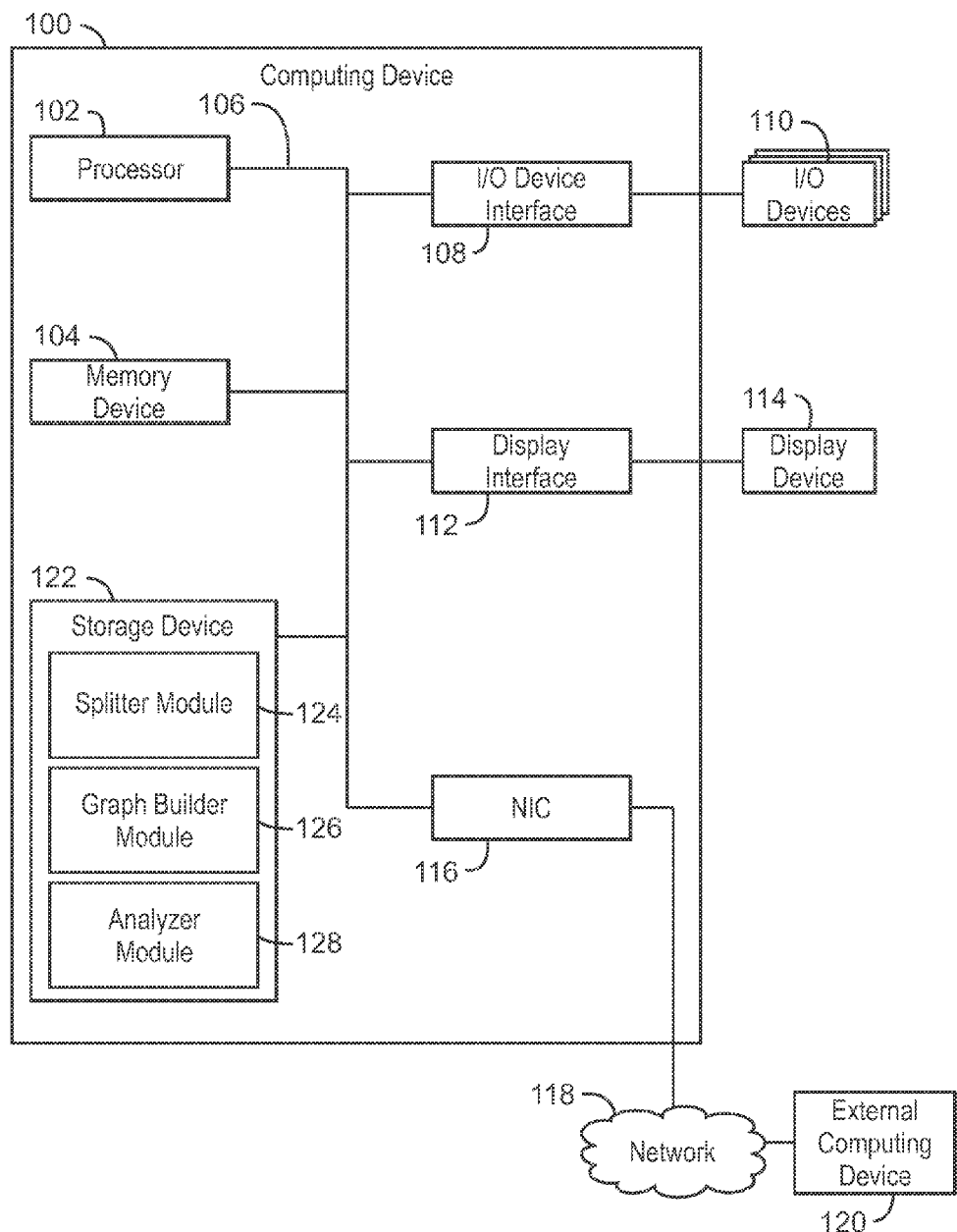
FIG. 1 is block diagram of an example computing device that can perform efficient static timing analysis.

High-performance integrated circuits are traditionally characterized by the clock frequency at which they operate. In gauging the ability of a circuit to operate at a specified speed, delays are generally calculated during the design process. While such timing measurements can be performed using rigorous circuit simulation, circuits may have hundreds of inputs and millions of possible input state combinations, making such an approach both expensive and time consuming.

Static timing analysis (STA) is a technique of computing the expected timing of a digital circuit without requiring extensive simulation. In particular, the behavior of each signal in all cycles of circuit operation can be folded into a single representative cycle. The arrival time (AT) of the signal can be calculated at various points of a circuit. Each AT can be expressed by two numbers: an early AT representing the earliest time at which a signal makes its first transition and a late AT representing the latest time at which it reaches a stable value after its last transition. As used herein, therefore, the arrival time of a signal is the time elapsed for a signal to arrive at a certain point of a circuit. The required arrival time (RAT), as used herein, is the latest time at which a signal can arrive without making a clock cycle longer than desired. As used herein, slack refers to the difference between the RAT and AT of a signal at a particular node in a timing graph.

In some examples, circuit designers may want to qualify circuit designs across many conditions. For example, the behavior of an electronic circuit may often be dependent on various factors in its environment like temperature or local voltage variations. Where many dependent factors can be variables, either the STA can be performed for more than one such set of conditions, or the STA can work with a range of possible delays for each component, as opposed to a single value. If the design works at each extreme condition, then under an assumption of monotonic behavior, the design is also qualified for all intermediate points. The extreme conditions may also be referred to herein as corners.

According to techniques of the present disclosure, a plurality of circuit designs can be incorporated into a single transistor-level timing model, using the configuration parameters as variation parameters of the propagations of the design. This enables a timing graph to be projected to each of the configurations. The configuration parameters of a model circuit can be evaluated on sub-circuits. A full set of dependencies can be determined based on each sub-circuit's dependent configuration parameters and configuration parameters that a load and inputs of the circuit is dependent on. A sample plan can be created for each sub-circuit, based on a set of configuration parameters on which the sub-circuit depends. A simulation can then be performed for each sub-circuit based on the sample plan for each circuit. A timing graph can be generated for the circuit by creating timing models for sub-circuits and connecting them in a graph representing the overall circuit. A timing model can be generated for each sub-circuit from a topological analysis and the output of the sample plans by curve fitting the delay and slew and generating algebraic forms and propagating them to the dependent timing models. For example, the algebraic forms can represent early delay, late delay, and slew. A piecewise-linear minimum and a piecewise-linear maximum can be determined for each of the algebraic forms of the arrival time from segments arriving at a common node in the timing graph. Arrival times and slew can be propagated in algebraic forms throughout the timing graph. Checks can then be evaluated based on selected projections from the timing graph or over a complete set of configurations to determine a configuration with a worst slack. By evaluating parameters for individual sub-circuits, rather than full cross-sections of the modelled circuits, one potential advantage of the present techniques is that computation time is improved. Furthermore, another potential advantage of the present techniques is that full coverage of the design space can be performed with minimal impact on runtime. For example, circuit configurations that do not have any impact on delay and/or slew can be excluded from simulation using techniques described herein. It is to be understood that some embodiments of the present techniques may not have these potential advantages and that these potential advantages are not necessarily required of all embodiments.

In some scenarios, the techniques described herein may be implemented in a cloud computing environment. As discussed in more detail below in reference to at least FIGS. 1, 3, and 4, a computing device configured to analyze digital circuits may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can analyze and generate timing reports for digital circuits. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include volatile memory and non-volatile memory. Volatile memory includes memory that requires power to maintain stored information, such as random access memory (RAM) or cache memory. Non-volatile memory can include all other forms of memory, including read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external server 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a splitter module 124, a graph builder module 126, and an analyzer module 128. For example, the modules may be included in an application such as a circuit analysis tool. The splitter module 124 can receive a parameterizable netlist or cross section and split the parameterizable netlist or cross section into sub-circuits. For example, the parameterizable netlist or cross section can be split into sub-circuits based on circuit channel connections. A circuit channel connection, as used herein, refers to a group of devices identified as being part of the circuit if a connection can be made by tracing through all the nets connect to the source or drain of the device and tracing through all the source or drain connections to the drain or source of the device (channel) iteratively. The graph builder module 126 can generate a timing model for each sub-circuit and then build a timing graph by combining the timing models of the sub-circuits. The graph builder module 126 can determine a full set of dependencies based on each sub-circuit's dependent configuration parameters and configuration parameters that a load and inputs of the circuit is dependent on. The graph builder module 126 can also generate a sample plan for each sub-circuit with dependencies based on the full set of dependencies. For example, the sample plan can be used by a simulator to simulate each sub-circuit based on an associated sample plan. The graph builder module 126 can then receive results from a simulation for each sub-circuit based on the sample plan for each sub-circuit. The graph builder module 126 can generate algebraic forms for an early delay, a late delay, and a slew by curve fitting across the configuration parameters. The analyzer module 128 can determine a piecewise-linear minimum and a piecewise-linear maximum for each of the algebraic forms of the arrival time from segments arriving at a common node in the timing graph and propagating arrival times and slew in algebraic forms throughout the timing graph. The analyzer module 128 can also evaluate checks based on selected projections from the timing graph or over a complete set of configurations to find the worst configuration.

In some examples, the analyzer module 128 can generate a timing report for the circuit based on the worst slack configuration. In some examples, the graph builder module 126 can further perform common-path-pessimism removal. In some examples, evaluating checks based on selected projections from the timing graph can include evaluating an algebraic form to a latest or earliest projection or evaluating a set of configurations and detecting a latest or earliest projected process. In some examples, building the timing graph further includes equation fitting. In some examples, the graph builder module 126 can process integer parameters as real number parameters in the equation fitting. In some examples, the graph builder module 126 can derive a loading effect of a sub-circuit of interest and capture the loading effect in an equation or a table. For example, the derived loading effect can be reused in the same run or across different runs.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the splitter module 124, the graph builder module 126, and the analyzer module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the splitter module 124, the graph builder module 126, and the analyzer module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
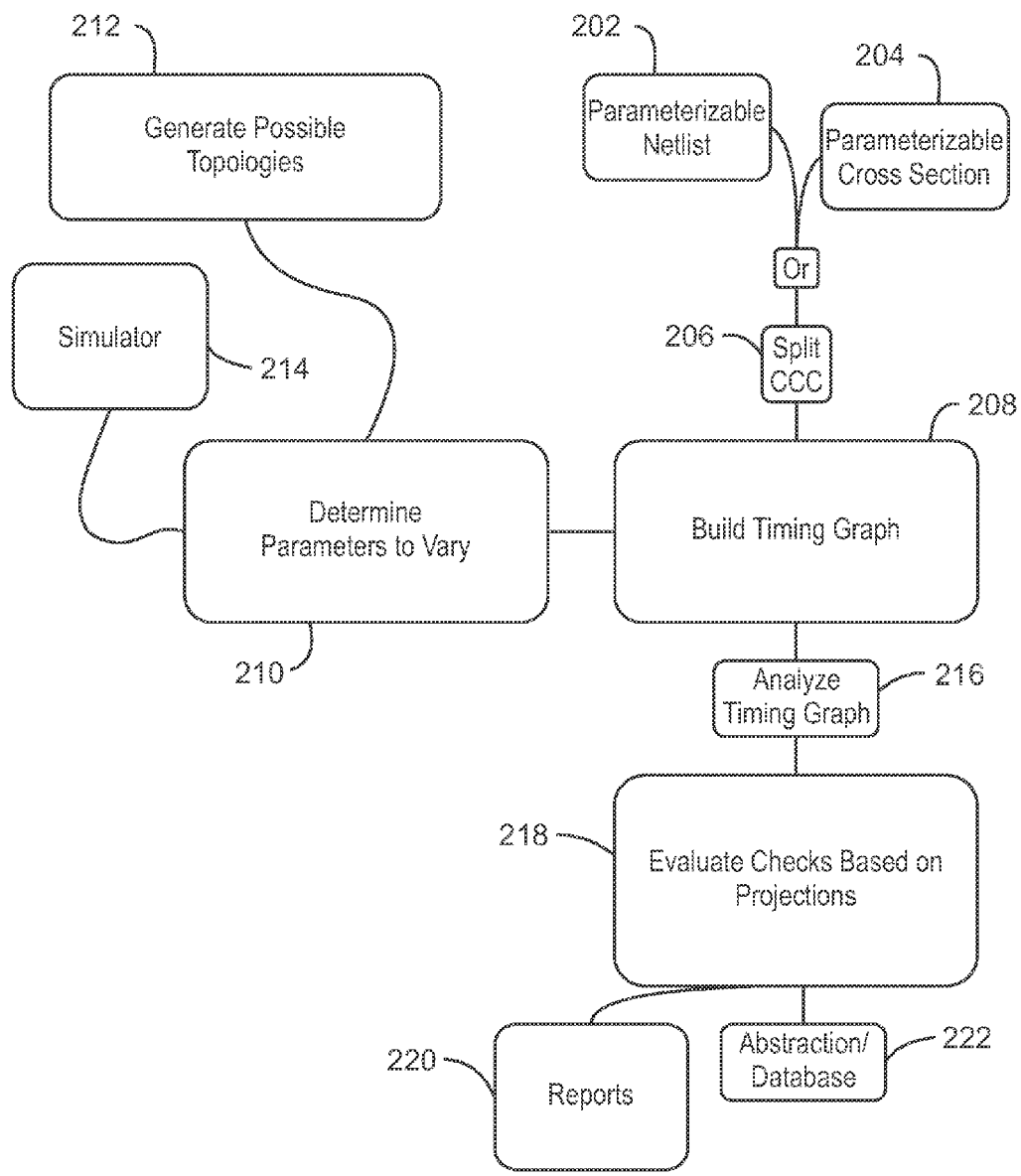
FIG. 2 is an example system that can generate timing reports across multiple circuit configurations.

FIG. 2 is an example system that can analyze circuit designs and generate timing reports across multiple circuit configurations. The example system of FIG. 2 is referred to generally by the reference number 200.

In FIG. 2, the example system 200 includes a parameterizable netlist 202 and a parameterizable cross section 204. The parameterizable netlist 202 and cross section 204 are inputs into a splitter 206. The splitter 206 is connected to a timing graph builder 208. The timing graph builder 208 is also given parameters 210 as input. These parameters 210 are coming from a topology generator 212 and a simulator 214. For example, the simulator 214 can be any type of transistor level simulator for time domain. The timing graph builder 208 is communicatively coupled to a timing graph analyzer 216. The timing graph analyzer is communicatively coupled to a check evaluator 218. The check evaluator 218 is communicatively coupled to a master file 220 containing reports and a database 222.

In the example system 200, a splitter 206 can receive a parameterizable netlist 202 or a parameterizable cross-section 204. Parameterizability, as used herein, refers to the ability to represent several possible designs that can be created by selecting values for each variable representing some aspects of the design that can differ between physical implementations. A netlist refers to a list of all the component terminals in a model circuit that should be electrically connected for the circuit to work. A cross-section, as used herein, refers to a set of modeled paths of a circuit used to represent the behavior of such circuit. Once the splitter receives the parameterizable netlist 202 or parameterizable cross-section 204, the splitter 206 can then split the circuit of the netlist 202 or cross-section 204 into sub-circuits. For example, the splitter 206 can split the netlist 202 or cross-section 204 into sub-circuits based on channel connected components. The split netlist 202 or cross-section 204 can be sent to a graph builder 208 for further processing.

The graph builder 208 receives the split netlist 202 or cross-section 204 and parameters 210 and builds a timing graph. The graph builder 208 can first generate a timing model for each sub-circuit including the parameters that a delay of each sub-circuit is dependent upon. Any unused variables are eliminated from the timing models for each sub-circuit. In some examples, parameters 210 can include process, voltage, temperature (PVT), load/slew variation, configuration parameters, and other variables to be included in the timing graph. Configuration parameters are those parameters that affect the configuration of a design, and can include, for example, a number of words, number of entries, number of bits, etc., with respect to a growable array. The parameters 210 to vary can be determined using possible topologies generated by topology generator 212. For example, the parameters to vary can be inferred from which parameters change the topology. The topology generator 212 can expand the possible number of legs of a topology to generate possible topologies. The topology generator 212 can also use extrapolation to generate possible topologies. The simulator 214 can perform simulations based on a sample plan for each sub-circuit and return delay and slew measurements. Additionally, the received cross-sections 204 can specify parameters that each sub-circuit is dependent upon through for example, connections to loads, wire models, inclusion of equations, parameters in the gate model names.

The graph builder 208 can determine if an input slew, an AT, or a load (a generalized RC), or circuit netlist parameter is dependent on any of the configuration parameters. If the inputs are dependent on an AT or slew that has not yet been determined, the sub-circuit is placed into a dependency queue for input circuits. Thus, the graph builder 208 can initially start with sub-circuits fed by primary inputs (PIs) and then proceed to sub-circuits dependent on the sub-circuits initially timed and so on. The initial PI times can be provided by the user. For example, initially just the load will be dependent on parameters since the timing graph starts with simulations only dependent on the PIs and then adds further dependencies accordingly. The graph builder 208 can then submit simulations according to the sample plan based on the set of dependent configuration parameters. In some examples, the configuration parameters can have discrete values. For example, if a configuration parameter represents physical instances such as number of a bit or word, then the configuration parameter can have discrete values such as 2, 4, 6, etc. In some examples, if the configuration parameter is a possible output load, then the configuration parameter can have a value between 0 and the maximum load value. The graph builder 208 can then express output slews as curves fit across the discrete values of the configuration parameters via interpolation. In some examples, the graph builder 208 can also simplify the equations based on sensitivity analysis. For example, if varying a parameter across a range changes the result by less than a threshold margin of error, then the parameter can be removed to simplify the equations.

The algebraic form for the delay from one sub-circuit is added to the algebraic forms at the input of the sub-circuits and the minimum and maximum are taken at the output. These algebraic forms are applied to the connected segments, for example a wire segment or a segment from another timing model. In this manner, algebraic expressions including the parameters 210 are propagated through each sub-circuit to fill a timing graph for the circuit. Thus, the timing graph can be produced by combining the timing models of the sub-circuits. The graph builder 208 can then use curve-fitted projections to feed the actual simulation sample plan. As used herein, an actual simulation plan contains enumerated values rather than parameters. For example, the graph builder 208 can pass the slew to a wire delay calculator to calculate the wire delay for each of the slew values. The output slew can then be expressed as a curve fit across the parameters. Since the slew is a part of the load, it is dependent on the same parameters as the load. Then, sub-circuits that are dependent upon signals that are determined to be dependent upon certain parameters can be simulated across those parameters in addition to the parameters on which the load is dependent. If the input signals and the load are dependent on different parameters, all valid combinations can be simulated. If different inputs are dependent on different parameters, then the graph builder 208 can determine if any of the simulations require relative arrival times of the inputs. If only a single input is switching, each of the parameters can be varied independently. If relative ATs are required for the simulations, the graph builder 208 can simulate every valid combination. If several parameters of the simulations depend on the same parameter, the graph builder can vary all the parameters together. In some examples, the graph builder 208 can use standard design of experiment (DOE) techniques to generate sample plan for simulation.

Still referring to FIG. 2, the graph analyzer 216 can analyze the timing graph generated by the timing graph builder 208. Once all the sub-circuits have gone through simulations for delay and slew, the graph analyzer 216 can propagate ATs along the graph and evaluate tests algebraically, as described previously. For example, the tests can be evaluated in algebraic form by summing the canonical forms before projecting to a particular configuration or resolving to the worse configuration, similarly to how statistical parameters are kept in algebraic form until the slack is to be resolved to a particular or worst corner. The graph analyzer 216 can take the multiple simulation results into the curve fitting to create algebraic forms. The graph analyzer can calculate ATs at the outputs of the gates using piece wise minimums and maximums of the algebraic forms of the incoming propagated ATs.

In some examples, the graph analyzer 216 can perform additional analysis on the algebraic forms. For example, the graph analyzer 216 can perform common path pessimism removal and slack computation on the algebraic forms. To generate slack reports, test results are evaluated for worst slack either algebraically or exhaustively. The test results can be evaluated exhaustively relatively inexpensively due to the limited number of combinations. Furthermore, evaluating algebraic functions is very fast and thus also inexpensive. In this way, the graph analyzer 216 can calculate the worst slack at every test point across all the configuration spaces and determine the configuration at which that slack occurs.

In some examples, the graph analyzer 216 can generate an abstraction for a selected set of configurations by evaluating the delay and slew equations at their configuration values. The abstraction can be saved to the database 222. Additionally, or in the alternative, the results of the analysis can be saved to a comprehensive master file 220. The master file 220 can include reports, the timing graph, etc.

Figure 3:
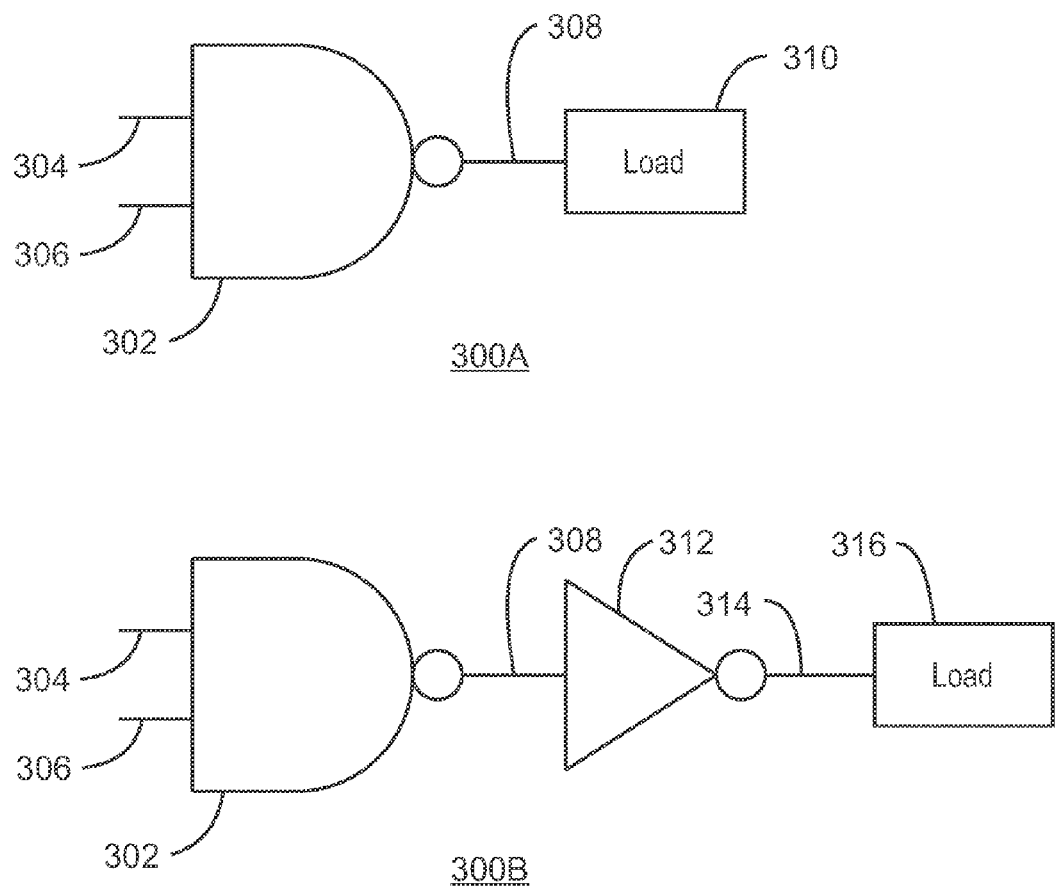
FIG. 3 shows example simulation reductions over a configuration space.

FIG. 3 shows example logic diagrams of simulation reductions over a configuration space. The example logic diagrams are referred to generally by the reference numbers 300A and 300B.

In the example logic diagram of 300A, a NAND gate 302 is shown with two inputs 304 and 306. The NAND gate 302 also has an output 308 connected to a load 310.

In the example logic diagram 300A, the input 304 can depend on some parameter X and therefore have an AT of $5X+2$ and a slew of $0.23X+25$. The input 306 may depend on another parameter Y and therefore have an AT of $5Y+2$ and a slew of $0.23Y+25$. Furthermore, a load capacitance at output 308 from load 310 may be $45X+12$. Since the timing path from input 306 to output 308 depends on both X and Y and the timing path from input 304 to output 308 depends on X, a total of $XY+X$ simulations can be performed to simulate all possible values. For example, if X has 5 possible values and Y has 2 possible values, then the total simulations to be performed can be $5 \times 2+5=15$ simulations.

In the example logic diagram 300B, a NAND gate 302 is shown with two inputs 304, 306 and output 308 connected to an inverter 312. The inverter 312 has an output 314 connected to a load 316.

In the example of 300B, the NAND gate 302 also has inputs 304 and 306. For example, input 304 may also be dependent on a parameter X and have an AT of $5X+2$ and a slew of $0.23X+25$. Input 306 may also be dependent on Y and have an AT of $5Y+2$ and a slew of $0.23Y+25$. However, the load capacitance at output 314 from load 316 of example 300B has no load capacitance dependent upon X. Therefore, since the timing path from input 304 to output 308 depends on X and the timing path from input 306 to output 308 depends on Y, then $X+Y$ simulations can be performed. If X has 5 possible values, and Y has 2 possible values, then the total simulations to be performed can be $5+2=7$ total simulations. In this example, the inverter 312 does not depend on any parameters since the inverter 312 would impact the load on the NAND, and the modeling does not require simulating both inputs at the same time.

Figure 4:
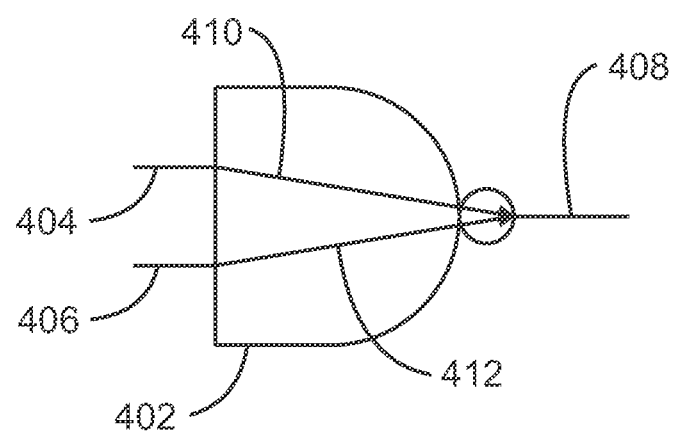
FIG. 4 shows another example simulation reduction over a configuration space.

FIG. 4 shows another example logic diagram of a simulation reduction over a configuration space. The example logic diagram is referred to generally by the reference number 400.

In the example of FIG. 4, the example logical diagram 400 includes a NAND gate 402 with inputs 404, 406 and an output 408. Path 410 connects input 404 to output 410 and path 412 connects input 406 to output 408.

In the example of 400, the input 404 may be dependent on a parameter X and therefore have an AT of $5X+2$ and a slew of $0.23X+25$. The input 406 may be dependent on a parameter Y and have an AT $5Y+2$ and a slew of $0.23Y+25$. The delay attributable to path 410 can be equal to $2X+5$ with an output slew of $0.2X+12$. The delay attributable to path 412 can be $2X+6$ with an output slew of $0.3X+11$. Therefore, for the path 410 the output 408 may have a maximum AT of $7X+7$ with a slew of $0.2X+12$. The path 412 can produce a maximum output 408 of $2X+5Y+8$ with a slew of $0.3X+11$.

If one path is always greater, then that AT/slew pair can be propagated. For example, if 7X+7 is always greater than 2X+5Y+8, then the graph builder can propagate 7X+7 for the late AT at the output 408 and 2X+5Y+8 for the early AT at the output 408. If neither path dominates, then the graph builder can propagate both AT/slew pairs. In this way, the total AT/slew pairs that are propagated by the graph builder can be reduced.

Figure 5:
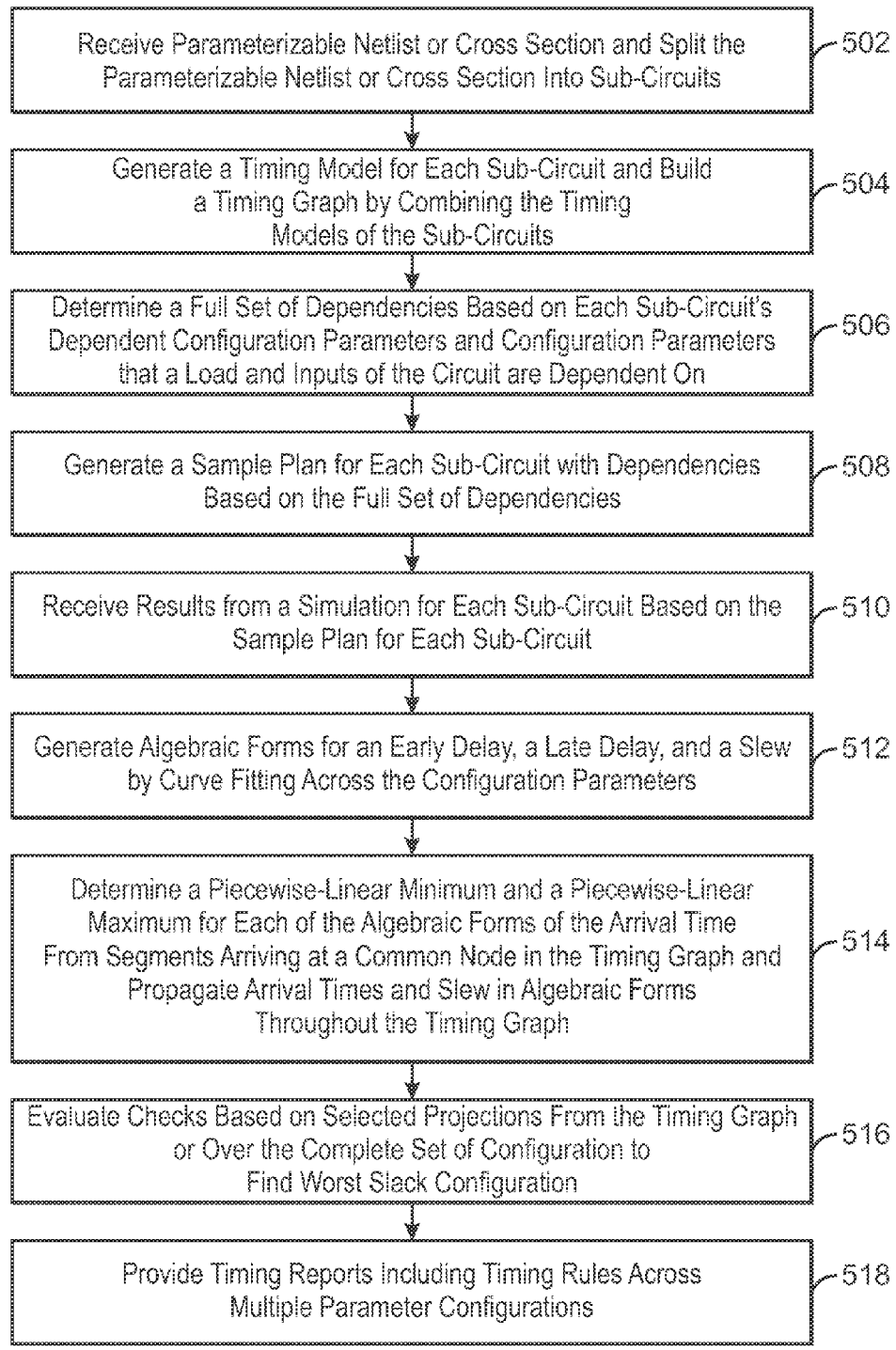
FIG. 5 is a process flow diagram of an example computer-implemented method that can generate timing reports across multiple circuit configurations.

FIG. 5 is a process flow diagram of an example computer-implemented method that can generate timing reports across multiple circuit configurations. The computer-implemented method 500 can be implemented with any suitable computing device, such as the computing device 100 of FIG. 1.

At block 502, the splitter module 124 receives a parameterizable netlist or cross section and splits the parameterizable netlist or cross section into sub-circuits. As used herein, parameterization refers to a method of representing several possible designs that can be created by selecting values for each variable representing some aspect of the designs that can differ between physical implementations. In some examples, the splitter module 124 can split the parameterizable netlist or cross section into sub-circuits based on circuit channel connections.

At block 504, the graph builder module 126 generates a timing model for each sub-circuit and builds a timing graph by combining the timing models of the sub-circuits. In the timing graph, values can be expressed as the algebraic forms of delay and slew of a wire between two sub-circuits in the circuit or delay and slew from the input to the output of a sub-circuit. For example, sub-circuits can be represented as segments in the timing graph with an associated delay and slew expressed in algebraic forms. The algebraic forms of minimums and maximums for delay and slew can be propagated throughout the timing graph. For example, two or more segments can merge into a single node, and a piecewise linear minimum and maximum can be taken from delay and slew and propagated as the minimum and maximum arrival time (AT) and slew into the connected segments. In some examples, a wire delay calculator can also add an appropriate wire delay to each of the slew values of the input of the dependent nodes. In some examples, an output slew at each node can be curve fitted across configuration parameters.

At block 506, the graph builder module 126 determines a full set of dependencies based on each sub-circuit's dependent configuration parameters and configuration parameters that a load and inputs of the circuit are dependent on. This set of configuration parameters can be used to determine which parameters the sample plans for each sub-circuit is to cover to generate curve-fitted results to fill in a value in the timing graph portion corresponding to each sub-circuit. For example, initially just the load can be dependent on the configuration parameters as the initial simulations can have primary inputs as their sole dependency for the sub-circuit inputs but not be dependent on any other sub-circuits. Sub-circuits in the dependency queue can then be simulated based on the results of the initial simulations. Each simulation can be selected for the sub-circuits based on the configuration parameters for which delay and slew is dependent. In some examples, if the input signals and the load are dependent on different parameters, all valid combinations can be simulated. In some examples, if different inputs are dependent on different parameters, then the graph builder module 126 can determine if any of the simulations will include relative arrival times of the inputs. In some examples, if only a single input is switching, each of the configuration parameters can be varied independently. In some examples, if relative arrival times are included in a simulation, every valid combination of configuration parameters can be simulated. In some examples, if several configuration parameters of the simulations depend on the same configuration parameter, all the configuration parameters will be varied together. The results of these simulations can be used to fill in timing values for each sub-circuit segment.

At block 508, the graph builder module 126 generates a sample plan for each sub-circuit with dependencies based on the full set of dependencies. For example, the sample plan can contain the set of configuration parameters to vary and a predetermined set of valid combinations of each parameter value. For example, a certain value of one parameter might not be valid for a certain value of another parameter. As used herein, a sample plan is a set of parameter combinations with which the circuit will be sent to the simulator. For example, a maximum, intermediate, and minimum value can be simulated for each configuration parameter. In some examples, generating a sample plan can include determining dependent configuration parameter values to vary based on sub-circuit topology and model accuracy. A sample plan can be then created based on the configuration-dependent AT and slew inputs for each sub-circuit. In some examples, sub-circuits that have inputs that depend on the arrival times or slews of other sub-circuits can be placed into a dependency queue. In some examples, standard design of experiment techniques can be used to generate the sample plan for simulation based on the dependences.

At block 510, the graph builder module 126 receives results from a simulation for each sub-circuit based on the sample plan for each sub-circuit. The results from each of the simulations from the sample plans for each segment is used to generate a min/max curve-fitted algebraic form which is used to fill in the timing graph. In some examples, integer parameters can be processed as real number parameters in the equation fitting.

At block 512, the graph builder 126 generates algebraic forms for an early delay, a late delay, and a slew by curve fitting across the configuration parameters. For example, the results from the simulation can be used to generate algebraic forms for early delay, late delay and slew for each sub-circuit timing model. In some examples, testing an algebraic form by sampling an intermediate parameter value and adjusting the algebraic form to include the value of the sampling result if the value of the sampling result value falls outside the algebraic form. For example, a new curve can be fitted across the configuration parameters to include the sampling result.

At block 514, the analyzer module 128 determines a piecewise-linear minimum and a piecewise-linear maximum for each of the algebraic forms of the arrival time from segments arriving at a common node in the timing graph and propagates arrival times and slew in algebraic forms throughout the timing graph. For example, the arrival times and slew in algebraic forms can be propagated through the timing graph by adding to the min/max algebraic form at the start of a segment with the min/max algebraic form for the segment. Segments depending on primary inputs can be analyzed for minimums and maximums first. The resulting early and late arrival times in algebraic form at the output of each initial segment can then be propagated to the input of each segment that depends on that initial segment. Each dependent segment in the timing graph will then be analyzed for minimum and maximum delays and slews and have a resulting minimum and maximum delay and slew as its value in algebraic form. For example, the value of the resulting minimum and maximum delay and slew can be a vector. In some examples, the analyzer module 128 determines timing bounds and calculates slack based on the linear minimum or maximum of each algebraic form in the timing graph. For example, the required arrival times can be propagated from right to left in the timing graph based on a required arrival time at the primary output (PO) node. In some examples, the analyzer module 128 can analytically resolve which configurations result in the earliest and/or latest arrival time at a PO node. For example, the values of configuration parameters can be algebraically determined that produce an earliest arrival time at the PO node. Likewise, the values of configuration parameters producing a latest arrival time at a node can be algebraically determined. In some examples, the analyzer module 128 can exhaustively resolve the configurations for which the earliest and/or latest arrival times occur. For example, the analyzer module 128 can run an analysis on every possible configuration of parameters on which delay and/or slew is dependent. The analyzer module 128 can then return the sets of configurations at which the earliest and latest arrival times occur. In some examples, the analyzer module 128 can perform common-path-pessimism removal on the timing graph. For example, paths exhibiting conflicting sensitizations can be removed using logical analysis. Path edge tracing can be used to find common points with common edges and remove any difference between the early and late arrival times. In some examples, the analyzer module 128 can evaluate a canonical form to a latest or earliest projection or evaluate a set of configurations and detect a latest or earliest configuration at a projected process corner.

At block 516, the analyzer module 128 evaluates checks based on selected projections from the timing graph or over a complete set of configurations to find the worst configuration. As used herein, a selected projection is a specific configuration of configuration parameters of interest to the user. For example, given a set of primary input (PI) signal times, configuration parameters, and expected times of signals at the POs, the analyzer module 128 can evaluate whether the expected times of arrival, also known as required arrival times (RATs), will be met at the PO nodes. The analyzer module 128 can evaluate a check between two nodes, requiring the minimum arrival time of one node to be larger than the maximum arrival time of another by a certain margin, which can be a canonical delay or slew modified in some manner. These tests can be created manually or automatically by topological analysis using any suitable analysis engines. In some examples, the checks can be evaluated by taking the differences between the algebraic forms of each of the components of the check. In some examples, the results are evaluated algebraically or exhaustively to find the worst configuration for that check, also sometimes called a test. For example, the check can be evaluated over the complete set of configurations to find the worst configuration. In some examples, the analyzer module 128 can generate timing bounds and calculate slack based on a linear minimum or maximum of each algebraic form in the timing graph. In some examples, the analyzer module 128 can evaluate a canonical form to a latest or earliest projection or evaluate a set of configurations and detect a latest or earliest projected process.

At block 518, the analyzer module 128 provides timing reports including timing rules across multiple parameter configurations. For example, the timing reports can be based on the timing graph and can include timing rules across different parameter configurations. In some examples, a report can include a selected set of configurations with evaluated delay and slew values at each set of configuration parameter values. In some examples, a timing report can include a corner based on a calculated worst slack. A corner, as used herein, refers to an extreme condition of a circuit. For example, the condition can be a voltage, temperature, or process.

The process flow diagram of FIG. 5 is not intended to indicate that the operations of the computer-implemented method 500 are to be executed in any particular order, or that all of the operations of the computer-implemented method 500 are to be included in every case. Additionally, the computer-implemented method 500 can include any suitable number of additional operations.

Figure 6:
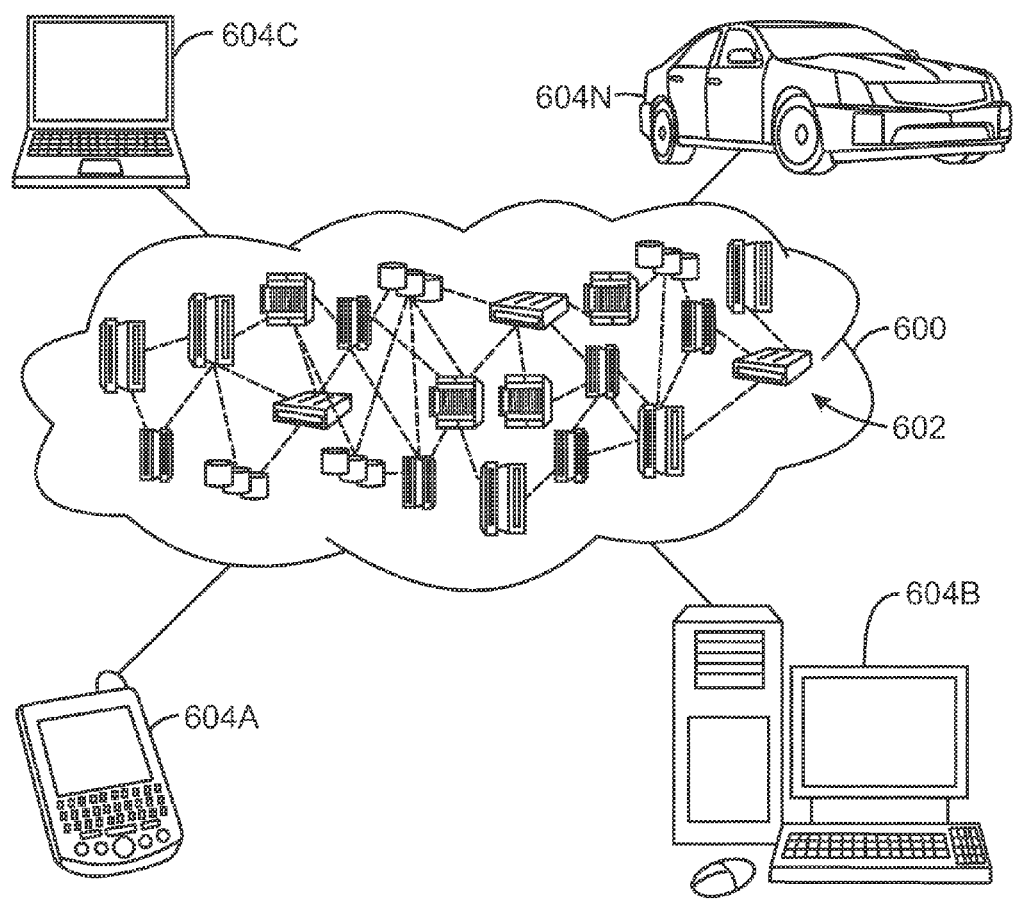
FIG. 6 is an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
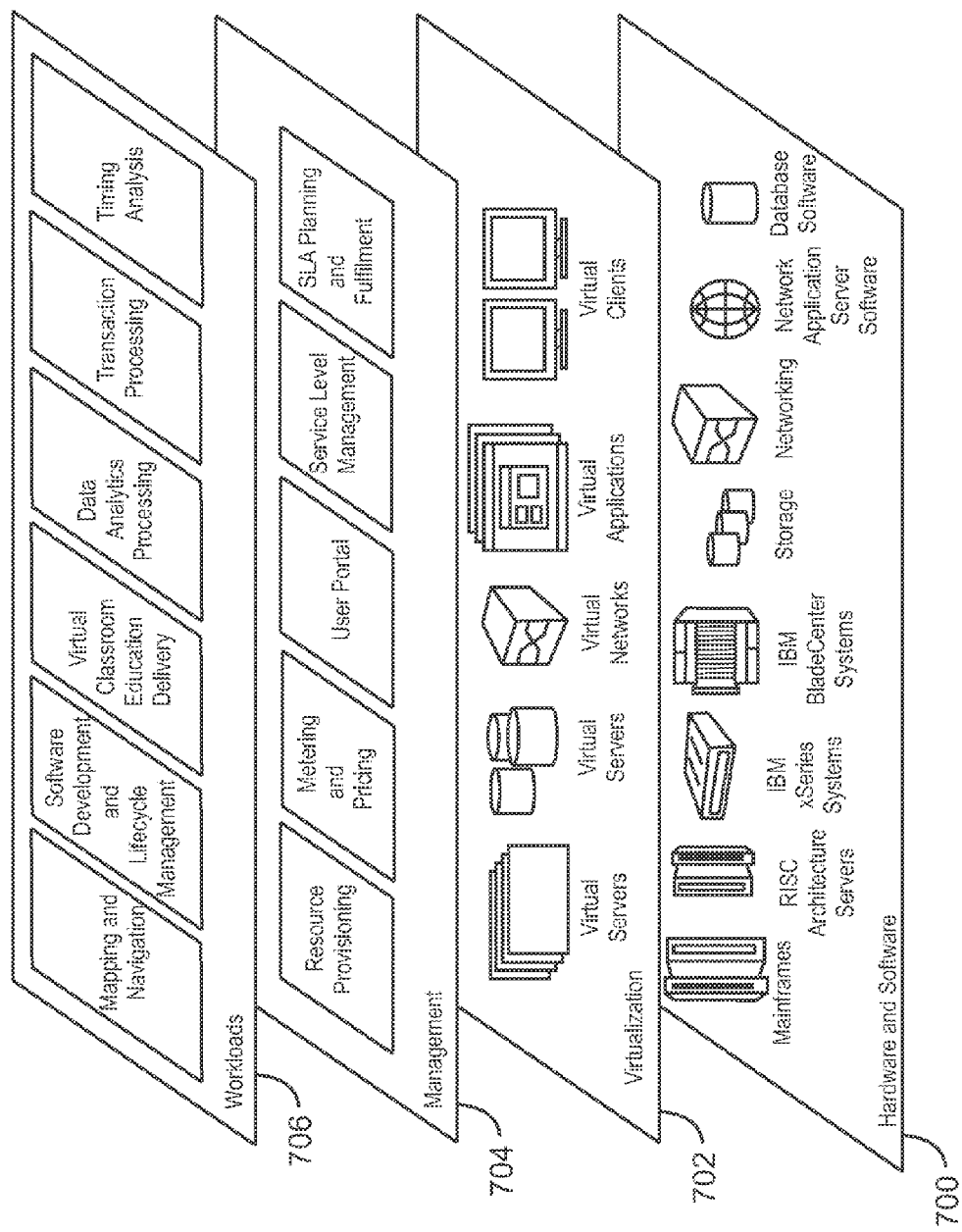
FIG. 7 is example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and timing analysis.

The present techniques may be a system, a computer-implemented method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of computer-implemented methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
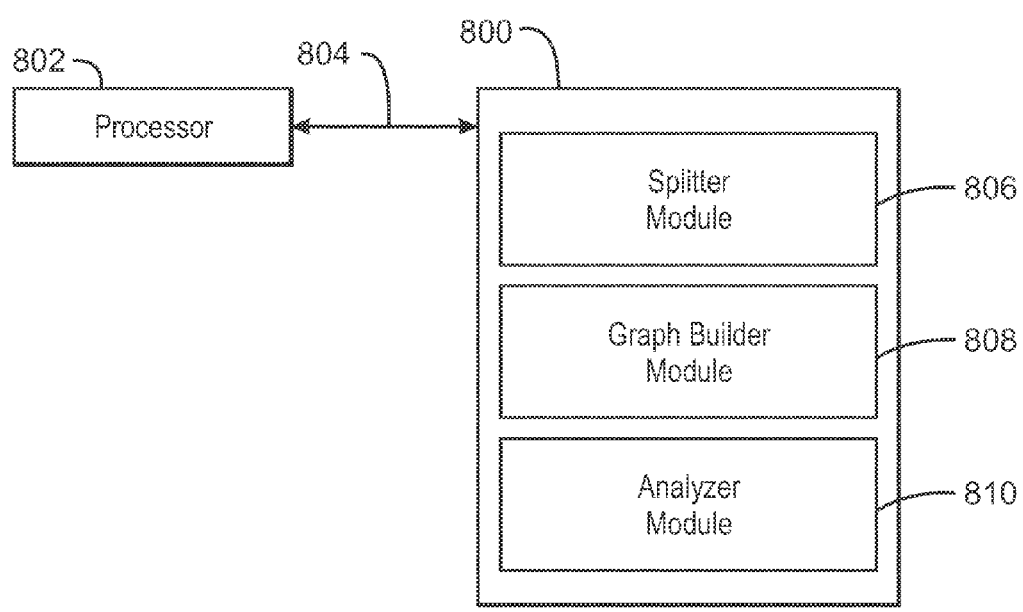
FIG. 8 is an example tangible, non-transitory computer-readable medium that generate timing reports across multiple circuit configurations.

Referring now to FIG. 8, a block diagram is depicted of an example tangible, non-transitory computer-readable medium 800 that can analyze and generate timing reports for digital circuits. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the current computer-implemented method.

The various software components discussed herein may be stored on the tangible, non-transitory, computer-readable medium 800, as indicated in FIG. 8. For example, a splitter module 806 includes code to split a netlist or cross section of a circuit into sub-circuits. A graph builder module 808 includes code to generate a timing model for each sub-circuit and build a timing graph by combining the timing models of the sub-circuits. The graph builder module 808 also includes code to determine a full set of dependencies based on each sub-circuit's dependent configuration parameters and configuration parameters that a load and inputs of the circuit are dependent on. The graph builder module 808 includes code to generate a sample plan for each sub-circuit with dependencies based on the full set of dependencies. The graph builder module 808 includes code to receive results from a simulation for each sub-circuit based on the sample plan for each sub-circuit. The graph builder module 808 includes codes to generate algebraic forms for an early delay, a late delay, and a slew by curve fitting across the configuration parameters. An analyzer module 810 includes code to determine a piecewise-linear minimum and a piecewise-linear maximum for each of the algebraic forms of the arrival time from segments arriving at a common node in the timing graph and propagating arrival times and slew in algebraic forms throughout the timing graph. The analyzer module 810 also includes code to evaluate checks based on selected projections from the timing graph and/or over the complete set of configurations to determine a worst slack configuration.

In some examples, the analyzer module 810 can generate a timing report for the circuit based on the worst slack configuration. The graph builder module 808 can further include code to perform common-path-pessimism removal. In some examples, the analyzer module 810 can include code to derive a loading effect of a sub-circuit of interest and capturing the loading effect in an equation or a table.

The flowchart and block diagrams in the Figures illustrate the architecture, functionality, and operation of possible implementations of systems, computer-implemented methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   split a netlist or cross section of a circuit into sub-circuits;
   generate a timing model for each sub-circuit and build a timing graph by combining the timing models of the sub-circuits;
   determine a full set of dependencies based on each sub-circuit's dependent configuration parameters and configuration parameters that a load and inputs of the circuit are dependent on;
   generate a sample plan for each sub-circuit with dependencies based on the full set of dependencies;
   receive results from a simulation for each sub-circuit based on the sample plan for each sub-circuit;
   generate algebraic forms for an early delay, a late delay, and a slew by curve fitting the results from the simulation across the configuration parameters;
   determine a piecewise-linear minimum and a piecewise-linear maximum for each of the algebraic forms of arrival times from segments arriving at a common node in the timing graph and propagate the arrival times and slew in algebraic forms throughout the timing graph; and
   evaluate checks based on selected projections from the timing graph or over a complete set of configurations to determine a configuration with a worst slack.

2. The system of claim 1, the processor to further generate a timing report for the circuit based on the worst slack configuration.

3. The system of claim 1, the processor to further perform common-path-pessimism removal.

4. The system of claim 1, wherein evaluating checks based on selected projections from the timing graph comprises evaluating an algebraic form to a latest or earliest projection or evaluating a set of configurations and detecting a latest or earliest projected process.

5. The system of claim 1, wherein building the timing graph further comprises equation fitting.

6. The system of claim 5, the processor to further process integer parameters as real number parameters in the equation fitting.

7. The system of claim 6, the processor to further derive a loading effect of a sub-circuit of interest and capture the loading effect in an equation or a table.

8. A computer-implemented method, comprising:
   splitting, via a processor, a netlist or cross section of a circuit into sub-circuits;
   generating, via the processor, a timing model for each sub-circuit and building a timing graph by combining the timing models of the sub-circuits;
   determining, via the processor, a full set of dependencies based on each sub-circuit's dependent configuration parameters and configuration parameters that a load and inputs of the circuit are dependent on;
   generating, via the processor, a sample plan for each sub-circuit with dependencies based on the full set of dependencies;
   receiving, via the processor, results from a simulation for each sub-circuit based on the sample plan for each sub-circuit;

generating, via the processor, algebraic forms for an early delay, a late delay, and a slew by curve fitting the results from the simulation across the configuration parameters;

determining, via the processor, a piecewise-linear minimum and a piecewise-linear maximum for each of the algebraic forms of arrival times from segments arriving at a common node in the timing graph and propagating the arrival times and slew in algebraic forms throughout the timing graph; and evaluating, via the processor, checks based on selected projections from the timing graph to find a worst slack configuration.

9. The computer-implemented method of claim 8, further comprising evaluating the checks over the complete set of configurations to find a worst slack configuration.

10. The computer-implemented method of claim 8, generating the sample plan for timing the sub-circuit comprising:

receiving, via the processor, the parameterizable netlist or cross section of the circuit;

determining, via the processor, dependent configuration parameters to vary based on sub-circuit topology and model accuracy; and creating, via the processor, the sample plan based on configuration-dependent AT and slew inputs for each sub-circuit.

11. The computer-implemented method of claim 8, further comprising testing an algebraic form by sampling an intermediate parameter value and adjusting the algebraic form to include the value of the sampling result if the value of the sampling result value falls outside the algebraic form.

12. The computer-implemented method of claim 8, further comprising generating, via the processor, timing bounds and calculating slack based on a linear minimum or maximum of each algebraic form in the timing graph.

13. The computer-implemented method of claim 12, further comprising performing common-path-pessimism removal on the timing graph.

14. The computer-implemented method of claim 8, wherein evaluating checks based on selected projections from the timing graph comprises evaluating a canonical form to a latest or an earliest projection or evaluating a set of configurations and detecting a latest or an earliest projected process.

15. The computer-implemented method of claim 8, further comprising providing, via the processor, a timing report based on the timing graph, the timing report comprising timing rules across different parameter configurations.

16. The computer-implemented method of claim 15, the timing report comprising a corner based on a calculated worst slack.

17. A computer program product for analyzing and generating timing reports for digital circuits, the computer program product comprising a computer-readable storage medium having program code embodied therewith, wherein the computer readable storage medium is not a transitory signal per se, the program code executable by a processor to cause the processor to:

split a netlist or cross section of a circuit into sub-circuits;

generate a timing model for each sub-circuit and build a timing graph by combining the timing models of the sub-circuits;

determine a full set of dependencies based on each sub-circuit's dependent configuration parameters and configuration parameters that a load and inputs of the circuit are dependent on;

generate a sample plan for each sub-circuit with dependencies based on the full set of dependencies;

receive results from a simulation for each sub-circuit based on the sample plan for each sub-circuit;

generate algebraic forms for an early delay, a late delay, and a slew by curve fitting the results from the simulation across the configuration parameters;

determine a piecewise-linear minimum and a piecewise-linear maximum for each of the algebraic forms of arrival times from segments arriving at a common node in the timing graph and propagate the arrival times and slew in algebraic forms throughout the timing graph; and evaluate checks based on selected projections from the timing graph or over the complete set of configurations to determine a worst slack configuration.

18. The computer program product of claim 17, further comprising program code executable by the processor to generate a timing report for the circuit based on the worst slack configuration.

19. The computer program product of claim 17, further comprising program code executable by the processor to perform common-path-pessimism removal.

20. The computer program product of claim 17, further comprising program code executable by the processor to derive a loading effect of a sub-circuit of interest and capturing the loading effect in an equation or a table.

* * * * *